United States Patent [19]

Takaoka et al.

[11] 4,263,814

[45] Apr. 28, 1981

[54] SHOE FOR USE IN A SWASH-PLATE TYPE COMPRESSOR

[75] Inventors: Hikaru Takaoka, Kariya; Teruaki Inoshita; Takashi Fukuda, both of Toyota, all of Japan

[73] Assignees: Kabushiki Kaisha Toyoda Jidoshokki Seisakusho; Taihou Kogyo Kabushiki Kaisha, both of Toyota, Japan

[21] Appl. No.: 57,697

[22] Filed: Jul. 16, 1979

Related U.S. Application Data

[63] Continuation of Ser. No. 815,426, Jul. 13, 1977, Pat. No. 4,037,522.

[30] Foreign Application Priority Data

Apr. 19, 1977 [JP] Japan ................................ 52-44808

[51] Int. Cl.[3] ................................ F16H 23/00

[52] U.S. Cl. ................................ 74/60; 308/3 C; 308/DIG. 8

[58] Field of Search .............. 74/60; 308/3 C, DIG. 8

[56] References Cited

U.S. PATENT DOCUMENTS

| | | | |
|---|---|---|---|
| 2,014,702 | 9/1935 | Sherman | 74/60 |
| 2,022,917 | 12/1935 | Larkin et al. | 308/3 C |
| 2,277,496 | 3/1942 | Maines | 308/3 C |
| 2,887,766 | 5/1959 | Fike et al. | 308/DIG. 8 |
| 3,308,524 | 3/1967 | Moyer | 308/DIG. 8 |
| 3,418,028 | 12/1968 | Watson et al. | 308/DIG. 8 |
| 3,891,287 | 6/1975 | Vogt | 308/DIG. 8 |
| 3,902,770 | 9/1975 | Hepp et al. | 308/DIG. 8 |
| 4,037,522 | 7/1977 | Inoshita et al. | 308/DIG. 8 |

FOREIGN PATENT DOCUMENTS

| | | | |
|---|---|---|---|
| 467397 | 6/1937 | United Kingdom | 308/DIG. 8 |
| 511726 | 8/1939 | United Kingdom | 308/DIG. 8 |

*Primary Examiner*—William H. Schultz
*Attorney, Agent, or Firm*—Browdy and Neimark

[57] ABSTRACT

A shoe for use in a swash-plate type compressor and made of a base material of steel, is slidably disposed between the swash-plate and a steel ball rotatably supported in a recess of a piston and is provided on one side thereof with a lining of copper or a copper alloy for slidably contacting with the sliding surface of the swash-plate and further provided on the other side thereof with a covering or a coating layer of a metal selected out of copper, copper alloys, aluminum, aluminum alloys, zinc, zinc alloys, nickel, chromium, and like metals, each of these metals being a material substantially free from seizure with steel, over a substantially spherical concave surface of the shoe thus permitting the steel ball to slidably rotate in relation thereto.

8 Claims, 9 Drawing Figures

SHOE FOR USE IN A SWASH-PLATE TYPE COMPRESSOR

This application is a continuation of Ser. No. 815,426, filed July 13, 1977 been patented as U.S. Pat. No. 4,037,522.

FIELD OF THE INVENTION

The present invention relates to a shoe used in a swash-plate type compressor and, more particularly, to a shoe highly resistant to load, high-speed sliding, impact, and wear.

BACKGROUND OF THE INVENTION

A swash-plate type compressor is one widely used in recent times for a refrigerant-compressor in an air conditioner of automotive. In such a compressor, a plural number of pistons, slidably fitted in a proper number of bores disposed in the cylinder block, is reciprocated by a swash-plate which is secured to a rotary shaft with a slant of a certain .angle and rotatable therewith, for compressing a gas for air-conditioning a vehicle.

In a swash-plate type compressor the transmission of motive power from the swash-plate to the piston, for reciprocating the piston, is generally carried out through a shoe and a ball. As the material for the shoe (1) a casting of aluminum alloy including 20% silicon by weight, and small amount of manganese and copper, or (2) a hot or cold drawn copper alloy including 10% aluminum, 3.5% iron, by weight, and inevitable impurities up to 0.5%, by weight, has been conventionally employed. Either of the two is defective because of its low productivity, high material cost, and poor resistance to heavy-load and impact.

In order to eliminate these defects or shortcomings the inventors have invented a shoe made of a base material of steel (hereinafter simply called base material) and having a sintered powder copper alloy integrally formed on the sliding surface with the swash-plate, where sliding is particularly severe or outstanding. The fact is widely recognized that this shoe is highly resistant to heavy-load and impact as well as extremely superior in high-speed slidability, wear resistance, and seizure resistance at the sliding surface with the swash-plate under the condition of high-speed sliding. Later experiments have proved, however, that this shoe is still not one hundred percent satisfactory with respect to insufficient manifestation of those advantages on the sliding surface with the ball and the likelihood of abnormally rapid wearing of the sliding surface or seizure with the ball in case of low-speed operation which is liable to invite a lubrication shortage.

SUMMARY OF THE INVENTION

It is therefore a primary object of this invention to provide a shoe which exhibits a sufficiently good slidability not only at the sliding surface on the swash-plate side but also at the sliding surface on the ball side.

It is another object of this invention to provide a shoe made of a base material of steel, which is economical in manufacturing, and superior in mechanical features such as hardness, strength, or rigidity, while maintaining a sufficiently high slidability at the sliding surface on the swash-plate side by applying a lining of a copper alloy, and a high resistance to load, impact, wear, or seizure at the sliding surface on the ball side by closely attaching a metal layer to cover the surface in various ways later described.

It is still another object of this invention to provide a shoe characterized in being economical and strong by means of using steel as the base material, and that each sliding surface, different in sliding conditions, is respectively treated or processed so as to meet the specific requirements.

It is a further object of this invention to provide a shoe which will eliminate the necessity of frequent change of shoes, as is often the case, because of its superior mechanical features such as high resistance to load, impact, etc., and excellent wear and seizure resistance, which leads to the reliability enhancement of the swash-plate type compressor.

DETAILED DESCRIPTION OF PREFERRED EMBODIMENTS

Figure 1:
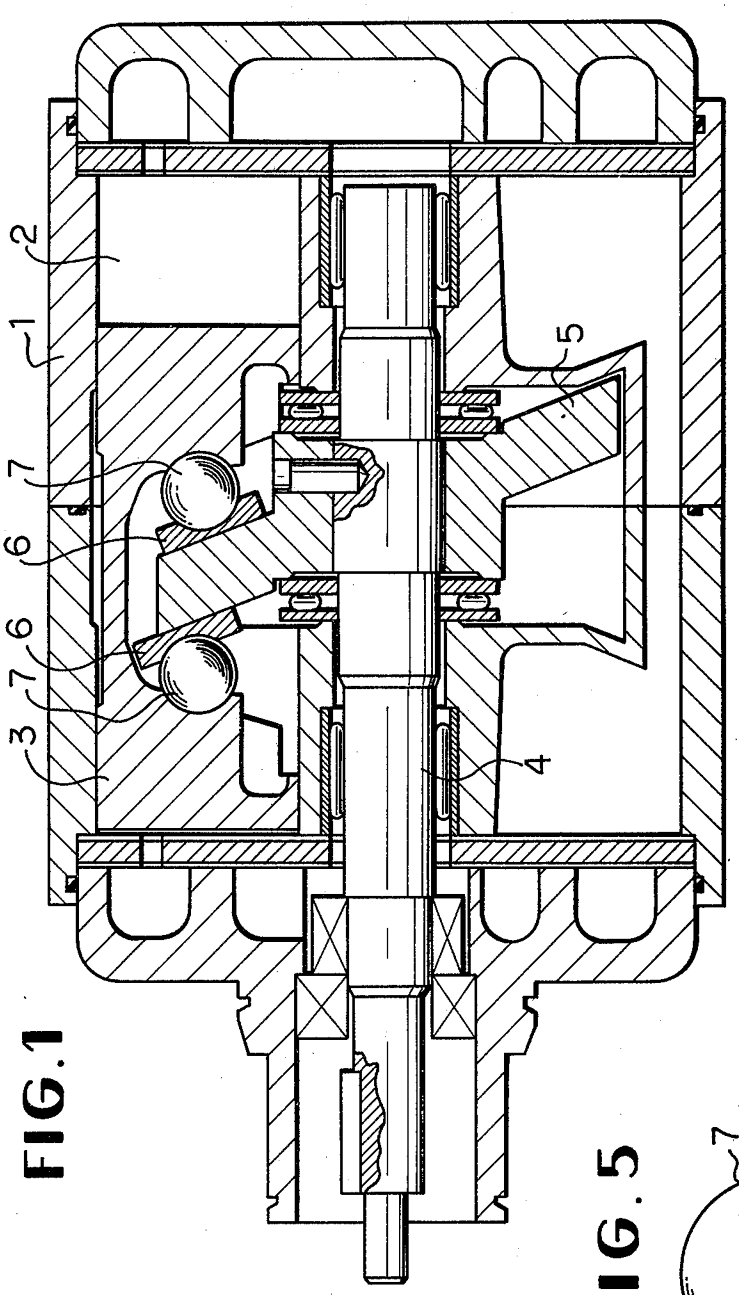
FIG. 1 is an axial sectional view of an example of the swash-plate type compressor incorporating a shoe which is the object theme of this invention.

Prior to entering the description of preferred embodiments some comments on the intentions and aims of this invention would be useful for better understanding.

This invention is aimed at the provision of a shoe which is economical and strong as well as capable of meeting two different requirements in regard to sliding conditions on either side of the same, i.e., on the swash-plate side and the ball side.

Generally speaking, the sliding surface on the swash-plate side is preferably an applied lining of a copper alloy of comparatively easy execution because of the flat form of the surface, irrespective of its severe sliding conditions; the sliding surface on the ball side, not so suitable for applying a lining irrespective of its fairly mild sliding conditions, is preferably covered with a metallic coating layer made of a material comparatively free from seizure with steel such as copper, copper alloy, aluminum, aluminum alloy, nickel, chromium, etc., in addition to a lining of a copper alloy.

As a coating or a covering material of the sliding surface on the swash-plate side of the shoe in accordance with this invention made of steel, a sintered metal is particularly preferable, consisting of 2.5–12.1%, by weight, tin, 7.0–25.0%, by weight, lead, and the balance substantially copper. A lining of copper or like metals formed by soldering or metal fusion, metal spraying, etc. is also feasible.

Concerning a covering of the sliding surface on the ball side, at least on the outermost layer where the same directly contacts the ball, a covering or coating layer is formed made of a metal selected from the group consisting of copper, aluminum, nickel, chromium, zinc, or a material including at least one of those metals as the principal component. When the thickness of this coating layer is up to 0.002 mm, it is not suitable for actual use because of the likelihood of its being rubbed off in the initial stage of wear to expose the base material of steel. When the thickness of the same is 0.5 mm or more, the features of the sliding surface will be determined only by the characteristics of the coating layer without enjoying a preferable influence of the base material of steel which would otherwise appear through the coating layer, i.e., mechanical features such as hardness, strength, etc. The thickness of the coating layer is therefore preferable to be within the range from 0.002 mm to 0.5 mm, particularly preferred between 0.004 mm and 0.3 mm.

In regard to the formation of a close covering or coating layer over the sliding surface on the ball side various ways are practicable:

(a) One such way is to lay a layer of copper or the like under pressure. In this method, an annular material for coating is placed in a cavity, pre-formed on one side of the base material by cutting or machining, and thereafter a male die with a force having semi- or partial-spherical configuration is pressed into the cavity. In this pressing process of the spherical force, the previously-formed cavity (hereinafter called pre-formed concavity) can be deformed substantially spherically simultaneously with the spreading of the annular material for coating under pressure between the base material and the spherical force in a manner to form the spherically concaved coating layer. This method is characteristic in capability of forming a fairly thick layer, firmly attached to the base material, with ease and preventing the exposure of the base material of the shoe over a long period of use.

(b) As the material for coating, copper, superior in slidability and malleability or ductility, is the best for the purpose. Copper alloys are also permissible: aluminum, aluminum alloys, zinc, zinc alloys, nickel, etc., which are all known suitable for use as a lining material at a sliding place with steel, may be passable.

(c) As a pre-formed concavity to be formed into a spherical concavity, an inverted-conical cavity is the best for the purpose. Pre-forming a cavity of approximately similar concave configuration is feasible.

(d) Forming an annular groove on the pre-formed concavity surface is recommendable for the purpose of letting a part of the annular material fill or inlay deeply thereinto to increase the holding effect between the coating material and the base material when applying the pressure thereon. It it also possible for this annular groove to be replaced or substituted by applying a cutting process on the inside surface of the pre-formed concavity to make the surface coarse or rugged for providing a lot of minute joining places between the coating layer and the base material.

(e) Plating is also applicable to the manufacturing of this type of shoe. On a base material having a layer of sintered copper alloy formed on one side thereof, a cavity of a desired spherical surface configuration is made in advance for subsequently being plated with a coating material. This plating may be performed in accordance with the conventional series of process steps, i.e., degreasing, water washing, pickling, and water washing; a single plating of copper, aluminum, nickel, chromium, zinc, etc. is possible; double or two-layer plating is, however, more preferable in respect of improving the anti-peeling off of the plated surface, in which nickel or chromium, comparatively easy to be plated on steel, is plated first followed by a second plating with copper or the like. Furthermore, the so-called mixed plating is also passable, such as, copper plus nickel, copper plus nickel and chromium, aluminum plus copper, or zinc plus copper. The plating method is good for getting a layer of uniform thickness, although it is not suitable for having a thick layer, and the uniform thickness may be advantageous in preventing a partial exposure of the base material during the operation even in case of a comparatively thin plating layer.

(f) This kind of shoe may be manufactured by plating the pre-formed concavity in advance, followed by pressing a force of a male die of desired configuration. The forcible fitting of the male die into the already plated pre-formed concavity will make the plating surface (spherical concave surface) smooth and exactly of desired configuration. This process is simultaneously helpful in giving a work-hardening to the coated layer and the outermost portion of the base material, which will lead to the decrease of wear on the sliding surface. In this case, either of single plating or double plating is applicable.

Figure 2:
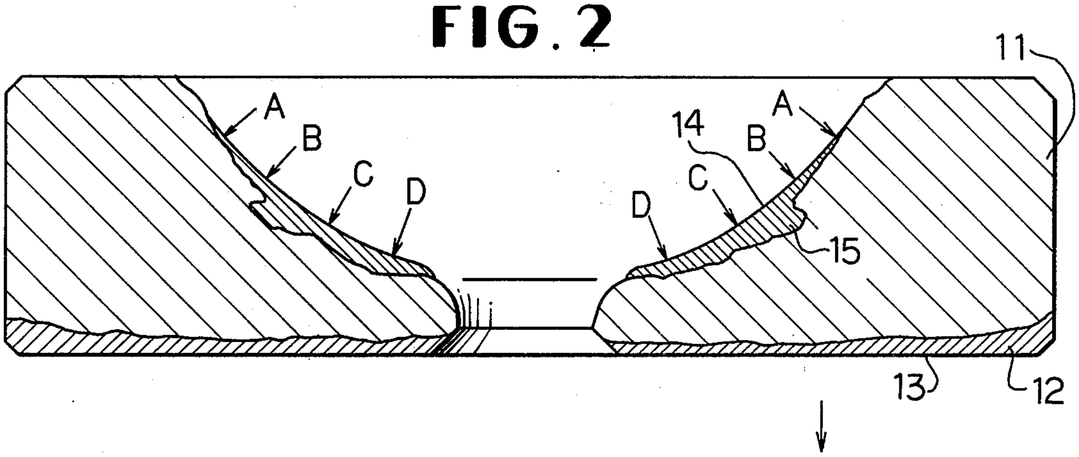
FIG. 2 is an enlarged sectional view of an embodiment of this invention.

Referring now to the figures, embodiments will be illustrated,. FIG. 1 is an axial section of a swash-plate type compressor. Numeral 1 represents a cylinder block, having three bores therein, each having slidably and gas-tightly accommodated a piston 3 as a pair. The piston 3 is driven by a swash-plate 5 which is secured to a rotary shaft 4 with a slant of a certain set angle. A shoe 6 transmits the driving force and power from the swash-plate 5 to the piston 3 via a steel ball 7, which shoe is shown in FIG. 2 in an enlarged cross-section. Numeral 11 represents a base material, one surface of which has a sintered metal layer 12 of powder copper alloy integrally attached thereto for constituting a sliding surface 13 on the swash-plate side, and the other surface of spherical concave configuration 14 is covered with a coated layer of copper 15.

A piece of cold-rolled steel plate SPCC (carbon content is 0.08–0.15% by weight) was used as the base material; and the sintered copper alloy layer was composed of 2.5–12.1% tin, 7.0–25.0% lead, by weight, and the balance substantially copper. A powdered alloy including those metals at a predetermined ratio was laid on the base material 11 for being heated at the temperature of 780° C. for 20 minutes in a reductive atmosphere, to form a sintered metal layer. It was machined or ground for finishing to the thickness of 0.1–0.5 mm after the formation process of the spherical surface, which will be later described. An excellent high-speed slidability and high resistance to wear and seizure of this sintered copper alloy layer 12 has been proved by experiments.

Figure 3:
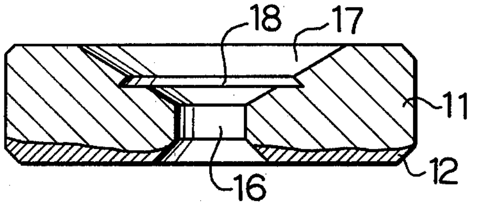
FIGS. 3 and 4 are respectively an explanatory view of a manufacturing method of the shoe shown in FIG. 2.
Figure 4:
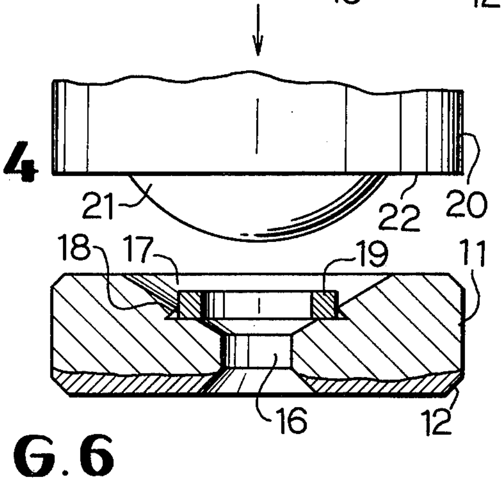

A copper coating layer 15 substantially of pure copper is, on the other hand, deeply filled or inlaid in-part, into the base material 11, being press-formed in part on the surface of the base material 11 to be firmly attached thereto in the following manner. This copper coated layer 15 in this embodiment was processed in accordance with the following series of steps: (1) machining a base material 11, on one surface of which a sintered copper alloy layer 12 has been firmly laid, into a form shown in FIG. 3 having a small diametered through bore 16, an inverted-conical shaped cavity 17, a pre-formed concavity, and an annular groove 18; (2) supplying a coating layer material 19 of annular configuration, as shown in FIG. 4, over or in the neighborhood of the annular groove 18; and (3) pressing a spherical force portion 21 of the male die 20 into the cavity 17 until the flat or shouldered portion 22 of the male die 20 abuts the upper surface of the base material 11. By means of pressing the partial-spherical force portion 21 into the cavity 17, the latter is formed into a cavity having a spherical configuration, the coating material 19 being simultaneously pressed under pressure between the spherical force portion 21 and the base material 11 partly inlaid into the annual groove 18 and partly extended, like flowing, onto the surface of the base material 11 to firmly adhere and become the copper coating layer 15.

Figure 5:
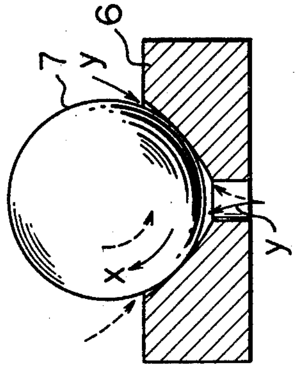
FIG. 5 is an exaggerated diagrammatic view of the contact relation between the shoe, shown in FIG. 2, and the ball.

The spherical concave surface 14 thus formed does not, in reality, have an exact spherical form but such a form wherein it contacts the ball of true spherical configuration only at a portion marked with the arrow B in FIG. 2; it does not contact the ball at a portion higher than the arrow B and/or lower than the arrow B. An exaggerated illustration of this situation is shown in FIG. 5. In such a condition, when the ball 7 rotates in the direction hinted by the arrow x relative to the shoe 6, lubrication oil will be advantageously supplied to the sliding surface of the ball and the shoe, as shown by the arrow y, due to the so-called wedge-effect. Furthermore, the ball 7 contacts the shoe 6 with a comparatively long contacting line (the line has, in reality, a certain width), so the contacting surface pressure can be lowered or reduced, to a great advantage. Reducing the contacting surface pressure is of great significance because the copper coated layer 15 is relatively low in hardness; but the real hardness thereof in the neighborhood of the arrow B indicates a passably high measured value of about 55 by the Rockwell B scale. It may be probably reasoned that a workhardening occured at the copper coating layer 15 itself and a favorable influence of the base material 11 sticking at the back side. The values in Table 1, an example of actually measured thickness of the copper coated layer 15, indicate that the general thickness is 0.5 mm or less with the exception of that in its inlaid portion into the base material 11. In the thickness of this degree, the sliding surface can enjoy not only the excellent slidability of the copper coated layer 15 but also the superior mechanical characteristics, such as hardness, strength, etc., because the base material 11 is allowed to manifest its mechanical characteristics even through the copper coated layer 15 to the sliding surface of spherical concave form.

TABLE 1

| | Thickness of the copper coating layer (mm) | | | |
|---|---|---|---|---|
| | A-portion | B-portion | C-portion | D-portion |
| left side | 0.19 | 0.25 | 0.32 | 0.35 |
| right side | 0.12 | 0.20 | 0.41 | 0.25 |

A shoe which had been made by the same method as that used for the shoe illustrated in FIG. 2 was incorporated in a swash-plate type compressor for compressing the refrigerant of the air conditioner for an actual test, the conditions set for the actual test being shown in the following Table 2.

TABLE 2

| | |
|---|---|
| Number of rotations per minute of the swash-plate | 648 rpm |
| Pressure: suction side | 1.5-2.0 Kg/cm$^2$ |
| Pressure: discharge side | 27-28 Kg/cm$^2$ |
| Amount of lubrication oil | 280 cc (nominal) |
| Sliding speed between the shoe and the ball | up to 0.4 m/sec. |
| The maximum contact surface pressure | 300 Kg/cm$^2$ |

Figure 6:
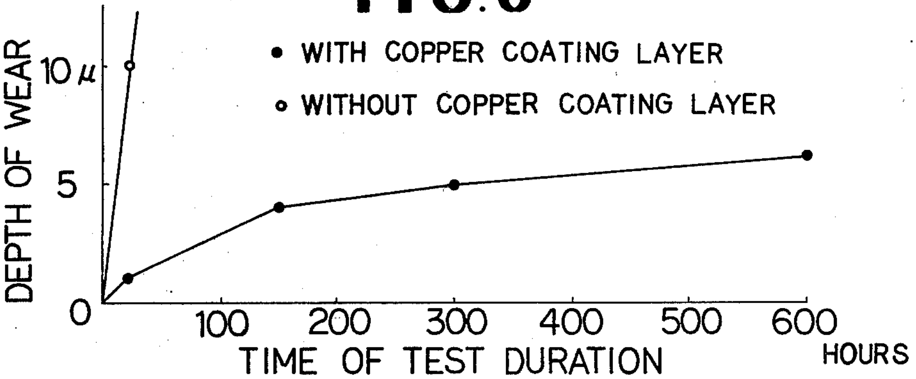
FIGS. 6 to 9 are graphs showing test results of wear resistance of shoes made in accordance with this invention.

The result of this actual test is shown in FIG. 6, wherein the number of rotations per minute 648 rpm, is particularly to be watched, because it is the lowest practical speed, in other words, the severest conditions for the shoe in which lubrication of the sliding surface often comes to shortage. After the lapse of this 600 hour test period, shown in FIG. 6, the amount of wear of the copper coated layer 15, that is the indication of the sinking amount or fall of the ball due to the wear of the coating layer 15, described an extremely gentle or flat slope. It indicates in the final stage only about 6 to 7 microns in the depth. By comparing this with a similar test data, executed with the same shoe having no copper coating layer under the same conditions, plotted in the same Figure, the extremely steep curve rising nearly upright, the shoe of this embodiment proved fully its superiority.

A second embodiment

Two of the shoes having a cavity or a pre-formed concavity of desired substantially spherical surface configuration respectively on one side thereof were made, one of which being coated with copper over the spherical concave surface, and the other coated with zinc thereover. The similar test was executed with each of these shoes under the conditions shown in Table 2. The test results, shown in FIG. 7, indicate a little superiority of the shoe coated with copper over the other one coated with zinc; both of them were remarkably better than the test data, simultaneously measured for the purpose of comparison with regard to the same shoe without a coating. It is worthy of attention that copper and zinc showed the excellent wear resistance alike, inspite of the common knowledge of those skilled in the art that copper is a substance of good slidability and zinc is opposite.

It is not theoretically solved why zinc, below low in slidability, showed such an excellent wear resistance. Only an assumption that a shoe coated with zinc rather could restrain the rotation of the ball in relation to the shoe for facilitating the sliding between the ball and the piston may be supported at the present stage.

A third embodiment

Figure 8:
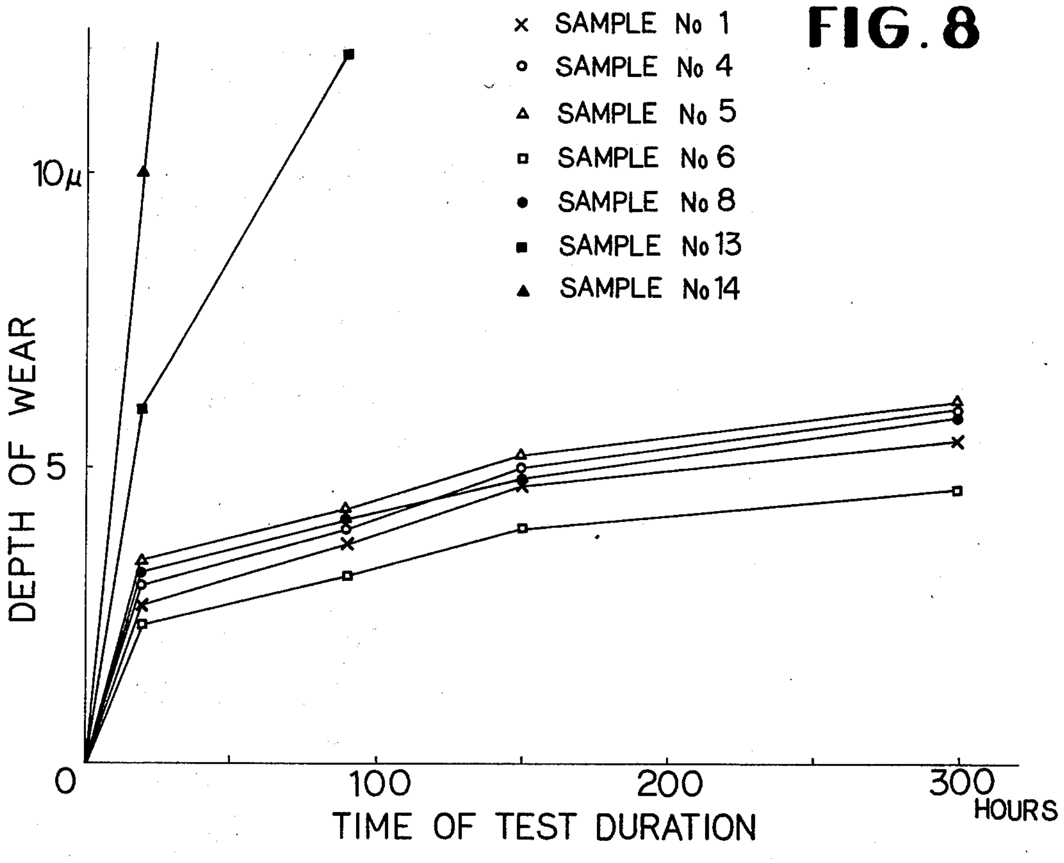

A base material of steel for a shoe, with an inverted-conical cavity on one surface thereof, was made just like in the first embodiment but no annular groove formed. In fourteen shoes of this type a plating, with only one exception, was carried out with metal in Table 3, respectively, over the inside surface of the cavity, followed by the pressing of a force of spherical configuration in a similar way to the first embodiment. These fourteen shoes, samples from No. 1 to No. 14, for the test in actual condition, were mounted respectively on a swash-plate type compressor used in the refrigerant compressing in an air conditioner. The test was performed under the conditions shown in Table 2 similarly to the previous one. Selected representative results were plotted in FIG. 8 as trend curves. The sample without plating, No. 14, taken for the purpose of comparison was the worst in wear resistance, as can be clearly observed, and the sample plated with Pb was still unsatisfactory, although a little effect was perceivable. All the samples which were plated (except No. 14), at least over the outermost layer wherein the shoe contacts the ball, with one metal out of copper, aluminum, nickel, chromium, and zinc, or with other metallic material including one of these metals as the principal component, proved to have excellent wear resistance, realistically manifesting the favorable effect of this invention. The base material is not restricted only to steel but replacable by other ferrous materials.

TABLE 3

| Sample No. | Plated metal | Plated thickness μ |
|---|---|---|
| 1 | Cu | 4.0 |
| 2 | Ni | 4.5 |
| 3 | Cr | 4.0 |
| 4 | Zn | 4.7 |
| 5 | Al | 3.5 |
| 6 | Ni + Cu (double layer) | Ni 2, Cu 3 |
| 7 | Cr + Cu (double layer) | Cr 4, Cu 3 |
| 8 | Cu + Ni (mixing) | 6.2 |
| 9 | Cu + Ni + Cr (mixing) | 5.2 |
| 10 | Al + Cu (mixing) | 4.3 |
| 11 | Zn + Cu (mixing) | 5.1 |
| 12 | Sn } For comparison | 4.2 |
| 13 | Pb } For comparison | 3.5 |
| 14 | No plating } For comparison | — |

A fourth embodiment

Four sample shoes, plated with copper in four different thickness, i.e., 2μ, 4μ, 10μ, and 20μ, were made and tested in an actual compressor respectively.

A sample with a plating of 2μ showed a little rapid wearing in comparison with other cases, in which the thickness of plating was 4μ or more. It can be assumed that the initial stage of wear already exposed partially the base material of steel.

Figure 7:
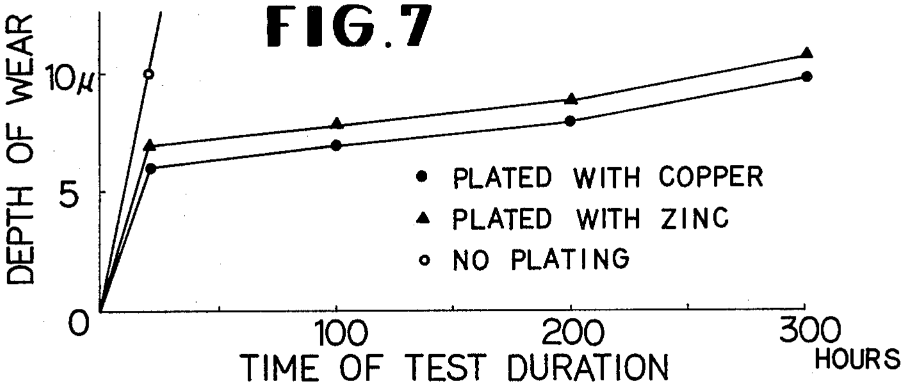
Figure 9:
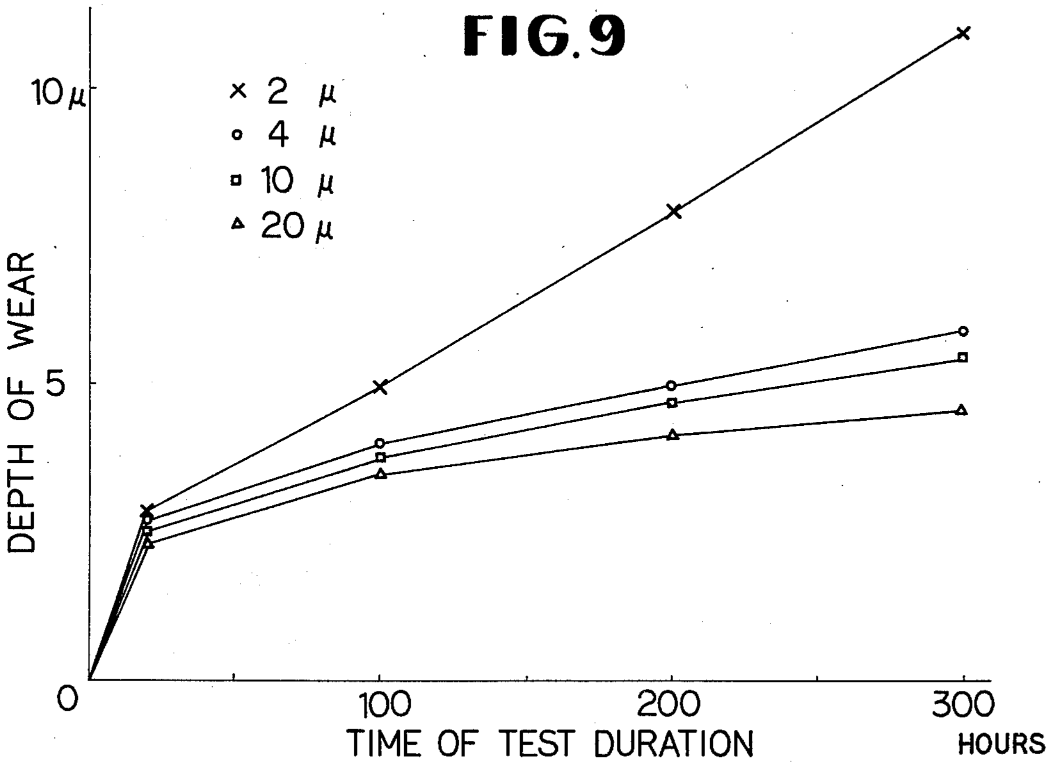

Even in this case the test result showed, as in FIG. 9, a much better status in comparison with that in FIG. 7 occurred with a sample shoe without any plating.

It will be obvious to those skilled in the art that various changes may be made without departing from the scope of the invention and the invention is not to be considered limited to what is shown in the drawings and described in the specification.

What is claimed is:

1. A shoe for use in a swash-plate type compressor, in which at least one piston slidably fitted in a cylinder barrel therefor is reciprocated by means of the rotative movement of a swash-plate secured to a rotatable shaft with a certain set slant angle, for compressing a gas, said shoe being inserted between a steel ball, rotatably fitted in a recess of said piston, and said swash-plate, comprising:

a base material made of ferrous metal having a flat surface on one side thereof on which surface the shoe is slidable on the swash-plate, and a substantially spherical concavity on the other side thereof in which concavity the ball rotatably slides; and a covering layer comprising one or more layers plated on said concavity in a total thickness of from 2 to 20μ, wherein the outer layer is copper.

2. A shoe in accordance with claim 1, wherein said covering layer comprises a single layer of copper plated on said concavity.

3. A shoe in accordance with claim 1, wherein said covering layer comprises a layer of nickel plated on said concavity and a layer of copper plated on said layer of nickel.

4. A shoe in accordance with claim 1, wherein said covering layer comprises a layer of chromium plated on said concavity and a layer of copper plated on said layer of chromium.

5. A shoe in accordance with claim 1, wherein said covering layer is formed by the pressing of a die of spherical configuration on a copper layer plated on a substantially inverted-conical cavity formed on said base material.

6. A shoe in accordance with claim 1, wherein said covering layer is plated on said concavity after said concavity has been formed into substantially spherical configuration.

7. A shoe in accordance with any one of claims 1–6, and further including a sintered copper alloy layer bonded to said flat surface in a thickness of from 0.1–0.5 mm, said sintered layer being formed by means of heating powdered alloy consisting essentially of 2.5–12.1% tin, 7.0–25.0% lead, both by weight, and the balance substantially copper, laid on said flat surface of said base material.

8. A shoe in accordance with claim 1, wherein said covering layer is from 3 to 10μ in thickness.

* * * * *